(12) United States Patent
Raffill et al.

(10) Patent No.: US 9,654,446 B2
(45) Date of Patent: *May 16, 2017

(54) ON-THE FLY PATTERN RECOGNITION WITH CONFIGURABLE BOUNDS

(71) Applicant: Dell Software Inc., Round Rock, TX (US)

(72) Inventors: Thomas E. Raffill, Sunnyvale, CA (US); Shunhui Zhu, San Jose, CA (US); Roman Yanovsky, Los Altos, CA (US); Boris Yanovsky, Saratoga, CA (US); John Gmuender, San Jose, CA (US)

(73) Assignee: SONICWALL INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,640

(22) Filed: Jul. 7, 2015

(65) Prior Publication Data

US 2015/0358286 A1 Dec. 10, 2015

Related U.S. Application Data

(63) Continuation of application No. 14/543,829, filed on Nov. 17, 2014, now Pat. No. 9,075,804, which is a (Continued)

(51) Int. Cl.
*G06F 17/30* (2006.01)
*H04L 29/06* (2006.01)
(Continued)

(52) U.S. Cl.
CPC ........ *H04L 63/0236* (2013.01); *G06F 3/0481* (2013.01); *G06F 7/02* (2013.01);
(Continued)

(58) Field of Classification Search
CPC ......... G06F 17/30011; G06F 17/30595; G06F 7/02; G06F 3/0481; G06F 2207/025;
(Continued)

(56) References Cited

U.S. PATENT DOCUMENTS 5,331,554 A 7/1994 Graham
6,092,038 A 7/2000 Kanevsky et al.
(Continued)

OTHER PUBLICATIONS

S. Dharmapurikar et al., Fast and Scalable Pattern Matching for Network Intrusion Detection Systems, 2006, vol. 24, Issue 10, 1781-1792.*

(Continued)

*Primary Examiner* — Jean B Fleurantin
(74) *Attorney, Agent, or Firm* — Polsinelli LLP (57) ABSTRACT

Some embodiments of on-the-fly pattern recognition with configurable bounds have been presented. In one embodiment, a pattern matching engine is configured based on user input, which may include values of one or more user configurable bounds on searching. Then the configured pattern matching engine is used to search for a set of features in an incoming string. A set of scores is updated based on the presence of any of the features in the string while searching for the features. Each score may indicate a likelihood of the content of the string being in a category. The search is terminated if the end of the string is reached or if the user configurable bounds are met. After terminating the search, the scores are output.

19 Claims, 5 Drawing Sheets

Related U.S. Application Data continuation of application No. 13/760,024, filed on Feb. 5, 2013, now Pat. No. 8,892,587, which is a continuation of application No. 13/196,480, filed on Aug. 2, 2011, now Pat. No. 8,370,374, which is a continuation of application No. 12/846,102, filed on Jul. 29, 2010, now Pat. No. 7,996,415, which is a continuation of application No. 11/881,530, filed on Jul. 27, 2007, now Pat. No. 7,792,850.

(51) Int. Cl.
    *G06F 7/02*     (2006.01)
    *G06F 3/0481*     (2013.01)

(52) U.S. Cl.
    CPC .... *G06F 17/30011* (2013.01); *G06F 17/3071* (2013.01); *G06F 17/30595* (2013.01); *G06F 17/30985* (2013.01); *H04L 63/0263* (2013.01); *G06F 2207/025* (2013.01)

(58) Field of Classification Search
    CPC ........... G06F 17/30985; G06F 17/3071; H04L 63/0236; H04L 63/0263
    USPC ...... 707/758, 803, 804, 805; 704/9, 10, 251, 704/257
See application file for complete search history.

(56) References Cited

U.S. PATENT DOCUMENTS

| | | | |
|---|---|---|---|
| 7,383,260 B2 | 6/2008 | Smith et al. | |
| 7,406,502 B1 * | 7/2008 | Oliver et al. | 709/206 |
| 7,565,678 B2 * | 7/2009 | Watson et al. | 725/132 |
| 7,739,253 B1 | 6/2010 | Yanovsky et al. | |
| 7,769,766 B1 | 8/2010 | Dubrovsky et al. | |
| 7,792,850 B1 | 9/2010 | Raffill | |
| 7,835,361 B1 * | 11/2010 | Dubrovsky et al. | 370/394 |
| 7,996,415 B1 | 8/2011 | Raffill | |
| 8,370,374 B1 | 2/2013 | Raffill | |
| 8,892,587 B2 | 11/2014 | Raffill | |
| 9,075,804 B2 | 7/2015 | Raffill | |
| 2004/0158480 A1 * | 8/2004 | Lubars et al. | 705/1 |
| 2004/0237098 A1 * | 11/2004 | Watson et al. | 725/25 |
| 2006/0031217 A1 | 2/2006 | Smith et al. | |
| 2007/0053653 A1 | 3/2007 | Huntington | |
| 2009/0254936 A1 * | 10/2009 | Watson et al. | 725/25 |
| 2015/0074099 A1 | 3/2015 | Raffill | |

OTHER PUBLICATIONS

Aho "Efficient String Matching: An Acid to Bibliographic Search", Association of Computing Machinery, Inc. 1975, 8 Pages.

Aho, Alfred V., "Efficient Tree Pattern Matching: An Aid to Code Generation," 1984, ACM, 7 pages.

Dharmapurikar et al., Sarang; Fast and Scalable Pattern Matching for Network Intrusion Detection Systems, Oct. 2006, IEEE, pp. 1781-1792.

Floratos, A, "Delphi: A pattern-based method for detecting sequence similarity-References,"May 2001, ACM, vol. 45, 455-473.

N-Gram, N-Gram—Wikipedia, the free encyclopedia, http://en.wikipedia.org/wiki/Ngram, Apr. 25, 2007, 5 Pages.

Sahinalp, Efficient approximate and dynamic matching of patterns using a labeling paradigm, Aug. 6, 2002, IEEE, 320-328.

"SurfControl Web Filtering Solutions," http://www.surfcontrol.com/Print.aspx?id-375&mid=4, Jun. 11, 2007, 6 pages.

U.S. Appl. No. 11/881,530; Final Office Action mailed Mar. 15, 2010, All pages.

U.S. Appl. No. 11/881,530; Office Action mailed Sep. 2, 2009, All pages.

U.S. Appl. No. 12/846,102; Office Action mailed Sep. 29, 2010, All pages.

U.S. Appl. No. 13/196,480; Final Office Action mailed Mar. 27, 2012, All pages.

U.S. Appl. No. 13/196,480; Office Action mailed Nov. 21, 2011, All pages.

U.S. Appl. No. 13/760,024; Office Action mailed Jan. 15, 2014, All pages.

U.S. Appl. No. 14/543,829; Office Action mailed Jan. 7, 2014, All pages.

* cited by examiner

ON-THE FLY PATTERN RECOGNITION WITH CONFIGURABLE BOUNDS

CROSS-REFERENCE TO RELATED APPLICATIONS

The present application is a continuation and claims benefit of U.S. patent application Ser. No. 14/543,829 filed Nov. 17, 2014, now U.S. Pat. No. 9,075,804, issued on Jul. 7, 2015, which is a continuation and claims the priority benefit of U.S. patent application Ser. No. 13/760,024 filed Feb. 5, 2013, now U.S. Pat. No. 8,892,587, issued on Nov. 18, 2014, which is a continuation and claims the priority benefit of U.S. patent application Ser. No. 13/196,480 filed Aug. 2, 2011, now U.S. Pat. No. 8,370,374, issued on Feb. 5, 2013, which is a continuation and claims the priority benefit of U.S. patent application Ser. No. 12/846,102 filed on Jul. 29, 2010, now U.S. Pat. No. 7,996,415, issued on Aug. 9, 2011, which is a continuation and claims the priority benefit of U.S. patent application Ser. No. 11/881,530 filed Jul. 27, 2007, now U.S. Pat. No. 7,792,850, issued on Sep. 7, 2010, the disclosures of which are incorporated herein by reference in their entirety for all purposes.

BACKGROUND OF THE INVENTION

Technical Field

Embodiments of the present invention relate to classifying content, and more specifically to on-the-fly pattern recognition with configurable bounds.

Background

Today, many entities are increasingly concerned with the use of their computing and networking resources to access the Internet. Various content filtering mechanisms are available to manage and/or control user access to contents (e.g., web pages and/or emails) from the Internet via facilities provided by the entities. Contents as used herein broadly refer to expressive work, which may include one or more of literary, graphics, audio, and video data. For example, a company typically implements some form of content filtering mechanism to control the use of the company's computers and/or servers to access the Internet. Access to content within certain predetermined categories using the company's computers and/or servers may not be allowed during some predetermined periods of time.

Conventionally, a content rating engine or a content classification engine may be installed in a firewall to screen contents coming into a system from an external network, such as email received and web pages retrieved from the Internet. The content rating engine may retrieve rating of the incoming contents from a rating database, if any, and/or attempt to rate the contents in real-time. To rate the content in real-time, the content rating engine may parse the contents and use a pattern matching engine to identify some predetermined keywords and/or tokens. Then the content rating engine may determine a rating for the contents based on the presence and/or absence of the keywords and/or tokens.

A conventional pattern matching engine typically adopts a specific pattern matching mechanism including some static rules, which may be suitable for one application, but not other applications. Since the rules are static, users may not change or update these rules to make the pattern matching engine more suitable for a different application. Thus, the pattern matching engine may not adapt to changes in the application and/or the circumstances.

SUMMARY OF THE CLAIMED INVENTION

A model-based content classification system includes a user interface that receives one or more user-configurable bounds on searching content. The bounds are received from a user. The system also includes a pattern matching engine that receives the one or more user-configurable bounds from the user interface. Using the user-configurable bounds, the pattern matching engine searches a string having known content for a predetermined pattern. The pattern matching engine then computes a plurality of scores. The scores indicate a likelihood that the content of the string corresponds to one or more predetermined content categories. In response to detecting the predetermined pattern, the pattern matching engine updates the scores using a plurality of weights associated with the predetermined pattern. The system also includes a content classification model generator that receives the updated scores from the pattern matching engine. The content classification model generator generates a content classification model based on the updated scores and transmits the content classification model to a model repository. The system further includes a content classification engine that accesses the content classification model stored in the model repository and classifies subsequent content based on the content classification model.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of on-the-fly pattern recognition with configurable bounds. As mentioned above, content as used herein broadly refers to expressive work, which may include one or more of literary, graphics, audio, and video data. Online content generally refers to content accessible over a network (e.g., an intranet, the Internet, etc.). Some content may be contained in a file, which is also referred to as a document in the current description. Some examples of a document include electronic mail messages (email), web pages, files downloaded over a network, etc. Nevertheless, client machines accessing the content generally receive the content in the form of one or more strings of bytes. In order to filter the content accessed, a string received is searched for any of a set of predetermined features, which are also referred to as patterns. In some embodiments, a pattern matching engine is configured based on user input, which may include values of one or more user configurable bounds on searching. To help the user to configure the bounds, a user interface may be generated using statistics collected from a set of documents with known classification. Then the configured pattern matching engine is used to search for a set of features in an incoming string. This may be referred to as pattern searching or pattern recognition. A set of scores is updated based on the presence of any of the features in the string while searching for the features. Each score may indicate a likelihood of the content of the string being in a category. The search is terminated if the end of the string is reached or if the user configurable bounds are met. After terminating the search, the scores are output. The pattern recognition with user configurable bounds disclosed herein may be used in various applications, such as generation of models for content classification, classification of web pages requested, classification of content of incoming electronic mail messages, etc. More details of some embodiments of the pattern recognition with user configurable bounds are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Such a medium may also be referred to as a machine-accessible medium.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1A:
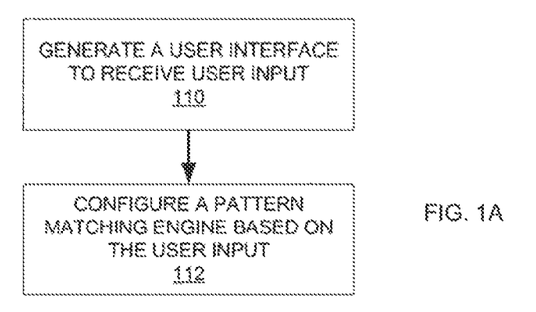
FIG. 1A illustrates one embodiment of a process to configure a pattern matching engine that performs on-the-fly pattern recognition.

FIG. 1A illustrates one embodiment of a process to configure a pattern matching engine that performs on-the-fly pattern recognition. The process may be performed by processing logic that may comprise hardware (e.g., circuitry, dedicated logic, programmable logic, microcode, etc.), software (such as instructions run on a processing device), firmware, or a combination thereof.

Referring to FIG. 1A, processing logic generates a user interface to receive user input (processing block 110). The user input includes one or more user configurable bounds for the search. Then processing logic configures a pattern matching engine base on the user input (processing block 112). Various bounds (also referred to as limits) of the search may be configured. Some examples include sample size, computation time, confidence level, maximum barren sample size, and minimum salience. More details of these examples are provided below to illustrate the concept. However, one should appreciate that not all of the examples are required in every embodiment of the invention. Moreover, some embodiments of the invention may include other bounds not listed below as well.

In some embodiments, the sample size is the maximum size of a subset of the input string to be examined. The pattern matching engine may stop and output the current partial scores after examining the partial input string up to the given sample size. For example, in a text application, the sample size may be the maximum number of characters to consider.

In some embodiments, the computation time is the maximum amount of time for the search to run. The pattern matching engine may stop and output the partial scores after running the given amount of computation time.

In some embodiments, the confidence level is the maximum confidence in a classification decision beyond which, the pattern matching engine should stop searching further in the input string. In some embodiments, the pattern matching engine should stop and output the partial scores after it has already accumulated the given scores for a set of categories.

In some embodiments, the maximal barren sample size is the maximum size of a subset of the input string to be examined if the pattern matching engine fails to find a minimum number of features in the input string. The minimum number of features is also referred to as the minimum salience. In other words, the pattern matching engine should stop with an empty output (such as a set of null scores) if the pattern matching engine has already examined a subset of the given size while observing less than the given number of features. As such, the pattern matching engine may stop examining a "barren" sample, which does not contain enough features to make any decision. This approach is particularly useful when the input string may include non-text context (e.g., video data in Motion Picture Experts Group (MPEG) format, audio data in MPEG Layer-3 (MP3) format, etc.), which may not be effectively screened using keyword search. It is because the pattern matching engine would not waste computation time to search through the entire input string for the keywords when the pattern matching engine determines that the input string contains substantially non-text data.

Note that various combinations of the above limits using logical operators AND, OR, and NOT, may be used in configuring the pattern matching engine. In other words, search termination conditions may be defined using one or more bounds (e.g., sample size, computation time, etc.). For example, processing logic may stop and output the partial scores if the following condition is met: (sample size>$L_1$ or computation time>$L_2$) and confidence level>$L_3$, where $L_1$, $L_2$, and $L_3$ are some predetermined values of the configurable bounds.

Figure 1B:
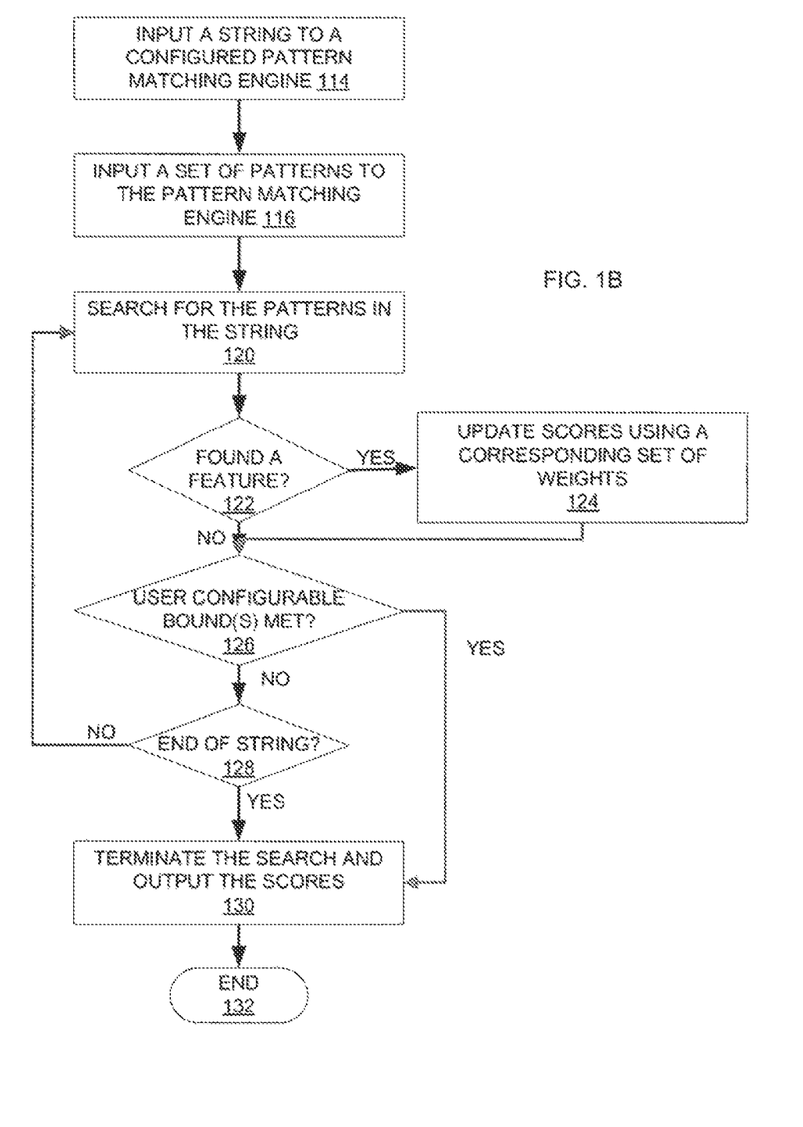
FIG. 1B illustrates one embodiment of a process to search for patterns in a string using a configured pattern matching engine.
Figure 1C:
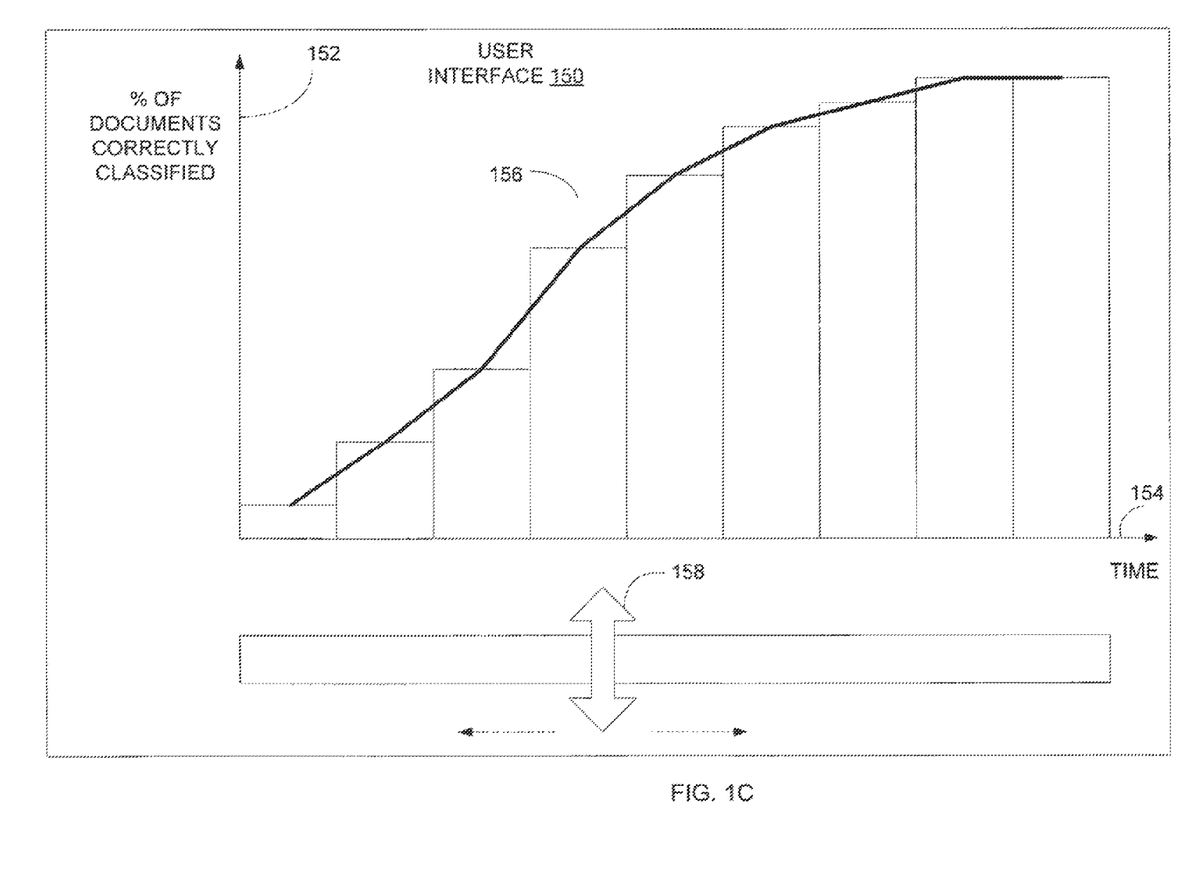
FIG. 1C shows an exemplary embodiment of a user interface to receive user input on one of the configurable bounds.

FIG. 1C shows an exemplary embodiment of a user interface to receive user input on one of the configurable bounds, namely, the computation time (or simply referred to as the time). The user interface 150 is a graphical user interface displaying a histogram 156 built from statistics collected from a set of documents whose correct classification is already known. The histogram 156 essentially indicates how many documents would be accurately classified under a given setting of the relevant configurable bound (which is time in the current example). The horizontal axis 154 of the histogram 156 represents time and the vertical axis 152 represents the percentage of documents correctly classified. A slider bar 158 in the user interface 150 allows a user to traverse the time axis and displays the cumulative distribution, which may be indicated by a percentage of documents correctly classified within the given time. The user may adjust the slider bar 158 to the desired point on the time/accuracy tradeoff. Note that similar user interface may be provided in different embodiments of the invention to allow users to set other configurable bounds. The statistics of the set of documents may be collected in various ways, one of which is described in detail below.

In some embodiments, a set of documents whose correct classification is already known is used to provide an estimate of how many documents would be accurately classified under a given setting of one or more configurable bounds. This set of documents is also referred to as the set of pre-classified documents. The set of pre-classified documents is a representative and statistically significant sample, which may include at least hundreds of documents in each category. The pattern matching engine is instrumented to record the statistics about intermediate classification decisions and resource usage levels at intermediate stages of processing. In some embodiments, the pattern matching engine is configured with no bounds. In other words, the pattern matching engine is set to continue processing the entire set of documents while gathering the statistics. This is because the processing of the set of pre-classified documents is an offline process and does not need to run in real time. However, if the set of pre-classified documents includes many large files (such as large binary files containing audio data encoded in MP3), and there is time constraint on the processing, then some bounds may be set even when gathering these statistics. For example, the user may take the available time divided by the number of very large documents as a rough guide to the time bound per document, and may take the seventy-fifth (75.sup.th) percentile of document size as a rough guide to the size bound per document. To collect the statistics of the set of documents, the set of pre-classified documents are input to the instrumented pattern matching engine to be processed. Specifically, in each pre-classified document, the pattern matching engine identifies features of a set of predetermined features. Scores of the document with respect to each of a set of categories are updated based on the features identified and the features' corresponding weights. The category with the top score and the known correct classification of the pre-classified document are recorded in a log file, along with the a current size of a segment within the pre-classified document that has been processed so far and the time spent on processing the segment so far. After all the pre-classified documents have been processed, a histogram (such as the histogram 156 illustrated in FIG. 1C) may be generated based on the data in the log file. The histogram indicates the configurable bound and accuracy tradeoff to users, who may then use a user interface, such as the user interface 150 in FIG. 1C to configure the pattern matching engine to process documents whose classification is unknown.

After the pattern matching engine has been configured based on user input, the pattern matching engine may be used to search for patterns, i.e., to perform pattern recognition with the configured bounds, as described below.

FIG. 1B illustrates one embodiment of a process to search for patterns in a string using the configured pattern matching engine described above. The process may be performed by processing logic that may comprise hardware (e.g., circuitry, dedicated logic, programmable logic, microcode, etc.), software (such as instructions run on a processing device), firmware, or a combination thereof.

Processing logic inputs the string into the configured pattern matching engine (processing block 112). The string may be a sequence of one or more of the following: bytes, tokens, characters, etc. Processing logic further inputs a set of patterns into the configured pattern matching engine (processing block 116). Note that the patterns may also be referred to as features. In some embodiments, the patterns are pre-selected (e.g., by data mining) such that the presence or absence of such patterns is indicative of the content being likely to be within one or more predetermined categories. For example, the patterns may include words such as "nude," "breast," etc., where the presence of which is indicative of the content being pornographic. The patterns may include a set of pre-selected tokens, N-grams, etc. Generally speaking, an N-gram is a sequence of N items, where N is an integer. Each N-gram corresponds to at least a portion of a keyword pre-selected for identifying content of a certain type. Furthermore, the N-grams may be of different lengths (e.g., one byte, two bytes, three bytes, etc.). The N-grams may be particularly useful in searching content in a non-delimited language, which may not provide a readily identifiable delimiter (e.g., space) between words.

Then the pattern matching engine searches for the patterns in the string (processing block 120). The pattern matching engine may use various search techniques to search for the patterns, such as a search by finite state automation. As the pattern matching engine searches through the string, the pattern matching engine may output patterns as the patterns are found. Thus, during the search, processing logic checks to determine if any feature is found (processing block 122). If so, processing logic updates a set of scores (processing block 124). Then processing logic transitions to processing block 126. Each of the set of scores is associated with a category of content, such as pornographic content, violent content, etc. The score indicates the likelihood of the content of the string to be in the corresponding category. There are various ways to compute the scores. One embodiment of score computation is described in details below to illustrate the concept.

In one embodiment, the set of patterns includes v features $f_1, f_2, \ldots, f_v$, which may be present or absent in the string. The features may be selected from content that have already been classified into one or more categories. Furthermore, there is a set of weights $w_{1,1}, \ldots w_{u,v}$, where $w_{i,j}$ expresses the contribution in favor of or against the membership of the string in category $C_i$ given by the presence of feature $f_j$. In some embodiments, the weights are tuned by machine learning. Processing logic uses a scoring formula F (features observed, weights of each feature) to express a score for the string's membership in each category, where the higher the score, the more likely the content of the string is a member of the category. In some embodiments, the formula F is of an iterative type. That is, the scores may be computed in a loop for i from 1 to the number of patterns observed. For example, the formula F may be a summation $\Sigma$.(1 if $f_i$ observed in the string, 0 if not)*$w_i$ or $\Sigma$.(number of times that $f_i$ is observed in the string)*$w_i$. The formula may be application-dependent and the formula may be selected from a predetermined set of formulae or created by the system developer. One should appreciate that the specific technique disclosed above are some of the examples of score computation. Other embodiments of the invention may compute scores using variations of the above technique.

If no feature is found in the string so far, processing logic checks to determine if the user configurable bounds are met (processing block 126). Some examples of the user configurable bounds have been discussed above. If the user configurable bounds are met, processing logic terminates the search and outputs the scores (processing block 130). Otherwise, processing logic checks to determine if the search has reached the end of the string (processing block 128). If the search has reached the end of the string, processing logic terminates the search and outputs the scores (processing block 130). Otherwise, processing logic transitions back to processing block 120 to continue with the search.

The above pattern recognition technique is more flexible than many conventional pattern recognition approaches because of the user configurable bounds. Based on the user configurable bounds set, the search may be terminated before reaching the end of the string if the user configurable bounds are met. Thus, these user configurable bounds limit the amount of computation. Further, users may change or update values of the user-configurable bounds (also referred to as reconfiguring the user configurable bounds) base on changes in the applications and/or circumstances. Thus, unlike the static rules applied in many conventional approaches, the user configurable-bounds provide a dynamic mechanism to search for features in the string.

Note that typically, the features in the input string are distributed reasonably uniformly, so that a diminishing returns law may apply after reaching a particular point in the analysis. Thus, searching the input string up to this particular point may provide a fairly accurate set of scores. Continuing the search beyond this particular point may not likely to result in any significant change in the scores. As such, the above approach improves efficiency by allowing users to configure bounds of the search according to the application of the search such that the search may be terminated on-the-fly when the potential return of continuing the search diminishes. The above pattern recognition technique has many practical applications, two of which are discussed in details below to illustrate the concept. The first application is model generation and the second application is content classification.

Figure 2A:
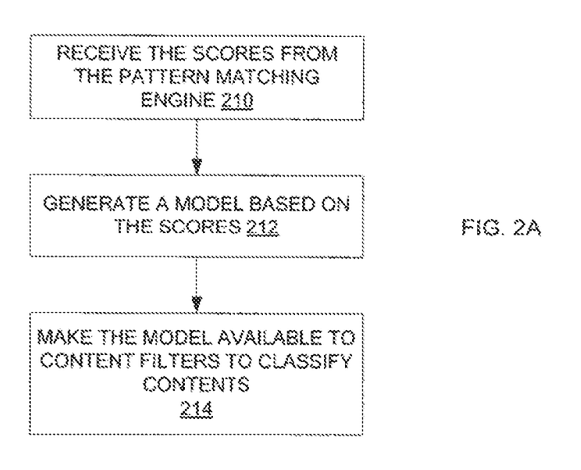
FIG. 2A illustrates one embodiment of a process to generate a model for classifying content.

FIG. 2A illustrates one embodiment of a process to generate a model for classifying content. The process may be performed by processing logic that may comprise hardware (e.g., circuitry, dedicated logic, programmable logic, microcode, etc.), software (such as instructions run on a processing device), firmware, or a combination thereof.

In some embodiments, a pre-classified document is searched using the on-the-fly pattern recognition technique discussed above. The pre-classified document may include a web page, an electronic mail, etc., where the content of which has been classified into one or more categories (e.g., pornographic content, violent content, etc.). After the search is terminated, processing logic receives the scores from the pattern matching engine (processing block 210). Based on the scores generated from the search, processing logic generates a model (processing block 212). For example, the model may be generated using statistical modeling technique. The model may be made available to content filters to classify contents (processing block 214). For instance, the content filters may classify the content of an incoming string by comparing scores of the model with scores of the incoming string, and then, may determine if access to the content is allowed under some predetermined policies. The incoming string may be at least part of a web page requested by a client, an electronic mail message directed to the client, etc. Details of one embodiment of content classification are discussed below.

Figure 2B:
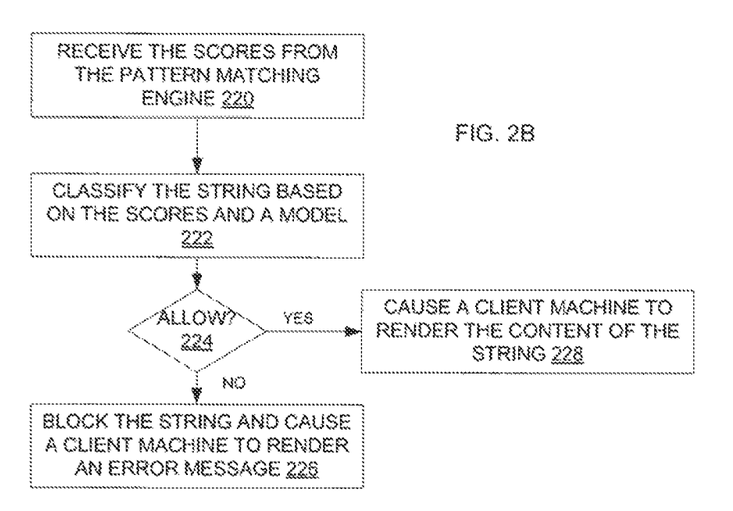
FIG. 2B illustrates one embodiment of a process to classify content.

FIG. 2B illustrates one embodiment of a process to classify content of a string. The process may be performed by processing logic that may comprise hardware (e.g., circuitry, dedicated logic, programmable logic, microcode, etc.), software (such as instructions run on a processing device), firmware, or a combination thereof.

In some embodiments, the string is input to a pattern matching engine with user configurable bounds. The configurable bounds have been configured and a search for a set of patterns is performed on the string as described above. When the search is terminated, a set of scores is output. Referring to FIG. 2B, processing logic receives the set of scores from the pattern matching engine (processing block 220). Furthermore, processing logic may have access to a model, which may be generated as discussed above with reference to FIG. 2A. Then processing logic classifies the content based on the scores and the model (processing block 222). For example, the model may be a model for identifying pornographic content, and thus, the model may also be referred to as a pornographic model. The pornographic model may include a set of conditions and/or thresholds that have to be satisfied or passed before the string is classified as pornographic. For example, the pornographic model may indicate that a first pattern has to occur more than a certain number of times for a string of a certain length in order to be classified as pornographic. If the scores of the string satisfy a predetermined number of conditions and/or passes a predetermined number of thresholds in the pornographic model, then processing logic may classify the content of the string to be pornographic. Alternatively, the model may be a model for identifying spam, and thus, be referred to as a spam model. If the scores of the string satisfy a predetermined number of conditions and/or passes a predetermined number of thresholds in the spam model, then processing logic may classify the content of the string to be spam.

Based on the classification of the content and some predetermined policies (e.g., company policies, school policies, etc.), processing logic determines if a user should be allowed to access the string of bytes (processing block 224). For instance, a school may have a policy barring access of pornographic material using school computers. Thus, processing logic may determine to deny access to the string by a user of a computer at the school if the content is classified as pornographic. Alternatively, if the content has been classified as spam, then processing logic may block the content and/or flag it to the user.

In some embodiments, processing logic causes a client machine to render the string if the user is allowed (processing block 228). For example, processing logic may forward the string to the client machine, which may execute a network access application (e.g., an Internet browser, an email engine, etc.) to display the content of the string. Otherwise, if the user is not allowed to access the string, processing logic may block the string and may cause the client machine to render an error message to the user (processing block 226). For example, processing logic may send an error signal to the client machine, which may generate the error message and display the error message via the network access application and/or in another window.

Figure 3A:
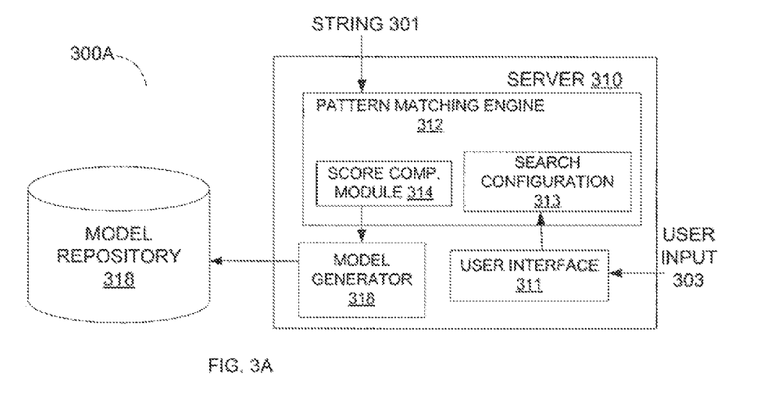
FIG. 3A illustrates a functional block diagram of one embodiment of a system to generate models for classifying content.

FIG. 3A illustrates a functional block diagram of one embodiment of a system to generate models for classifying content. The system 300A includes a server 310 and a model repository 318. The server 310 further includes a user interface 311, a pattern matching engine 312, and a model generator 318. The server 310 may be implemented using a computing machine, such as the one illustrated in FIG. 4. To illustrate the operations of the system 300A, one example is discussed in details below.

In some embodiments, the user interface 311 of the server 310 receives some user input 303. The user interface 311 may include a graphical user interface (GUI), a command line interface (CLI), etc. The user input 303 may include one or more user configurable bounds on searching. Based on the user input 303, the pattern matching engine 312 is configured. For example, the user input 303, including the configurable bounds, may be written into a search configuration file 313 accessible by the pattern matching engine 312. The pattern matching engine 312 may apply the configurable bounds in the search configuration file 313 onto a search in progress to limit the search. Since this search is performed in the backend and a real-time response is not required, the user may specify generous bounds (e.g., a longer computation time limit, a larger sample size, etc.). Some examples of the user configurable bounds and how the configurable bounds may limit a search have been discussed above.

After the pattern matching engine 312 has been configured, a string 301 having some known content is input to the pattern matching engine 312. The string 301 may be part of an email, a web page, etc. The pattern matching engine 312 searches for a set of predetermined patterns in the string 301. During the search, the score computation module 314 of the pattern matching engine 312 computes a set of scores. Each of the scores is associated with a content category. When a pattern is found in the string, the score computation module 314 may update the scores using a set of weights associated with the pattern. Details of some embodiments of score computation have been discussed above.

When the pattern matching engine 312 reaches the end of the string 301 or when the configurable bounds are met, the pattern matching engine 312 terminates the search and outputs the scores to the model generator 318. Using the scores, the model generator 318 generates a model usable by classifying engines in content filtering clients to classify contents. The model may be stored in the model repository 318, which may be accessible by content filtering clients across a network (e.g., an intranet, the Internet, etc.). Alternatively, the model may be transmitted or downloaded to the content filtering clients (e.g., firewall), which store the model in storage devices (e.g., ROM, flash memory, etc.) within the content filtering clients. More details on classifying contents using the model are discussed below.

Figure 3B:
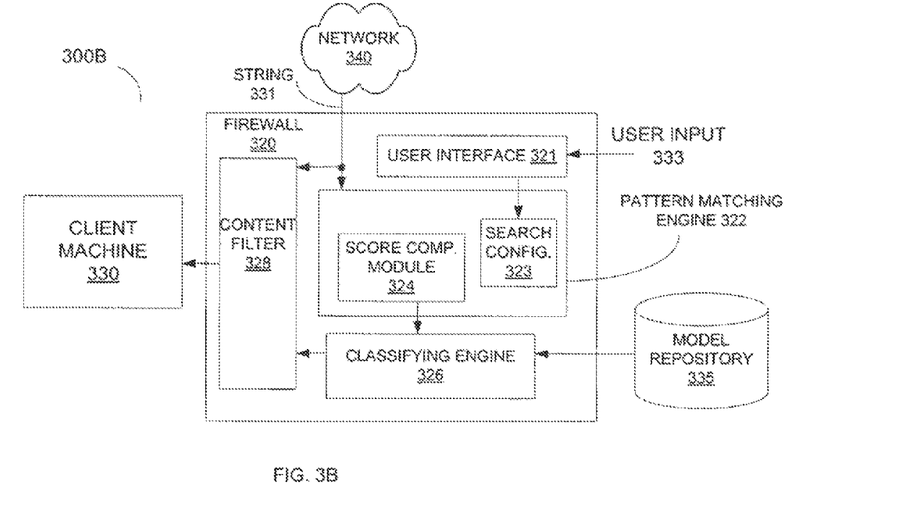
FIG. 3B illustrates a functional block diagram of one embodiment of a system to classify content.

FIG. 3B illustrates one embodiment of a system to classify content. The system 300B includes a firewall 320, a client machine 330, a model repository 333, and a network 340. The network 340 is coupled to the client machine 330 via the firewall 320. The client machine 330 may include a computing machine, such as a desktop personal computer (PC), a laptop PC, a personal digital assistant (PDA), a mobile telephone, the computing machine illustrated in FIG. 4, etc. A network access application (e.g., a browser, an electronic mail engine, etc.) may be executed on the client machine 330 to access content over the network 340. The network 340 may include one or more kinds of network, such as an intranet, the Internet, etc. The firewall 320 is further coupled to the model repository 335. In the current example, the model repository 335 is directly coupled to the firewall 320. Alternatively, the model repository 335 may be indirectly coupled to the firewall 320 via the network 340.

The firewall 320 is one example of a content filtering client. In some embodiments, the firewall 320 may be implemented in a set-top box having components such as a processor, network interface, one or more storage devices (e.g., RAM, ROM, flash memory, etc.), etc. Alternatively, the firewall 320 may be implemented on a proxy server (also referred to as a gateway server). A functional block diagram of the firewall 320 is illustrated in FIG. 3B.

Referring to FIG. 3B, the firewall 320 includes a user interface 321, a pattern matching engine 322, a classifying engine 326, and a content filter 328. The user interface 321 may include graphical user interface (GUI), command line interface (CLI), physical user input devices (e.g., keys, buttons, etc.), etc. The user interface 321 allows users to input configurable bounds for the pattern matching engine 322. The configurable bounds may be written into a search configuration file 323 usable by the pattern matching engine 322 to limit a search. Since the firewall 320 provides real-time content filtering to the client machine 330, efficiency of the search is of high importance. Therefore, users may set strict bounds on the search (e.g., a shorter computation time limit, a smaller sample size, etc.).

In some embodiments, the firewall 320 receives a string 331 from the network 340. The string 331 may be part of a web page requested by the client machine 330, an electronic mail message directed to the client machine 330, etc. In some embodiments, the firewall 320 is also referred to as a spam filter when the firewall 320 is used to screen the contents of incoming electronic mail messages. The string 331 is forwarded to both the content filter 328 and the pattern matching engine 322. The pattern matching engine 322 performs a search for a set of predetermined patterns on the string 331, subject to the configurable bounds in the search configuration file 323. Details of some embodiments of the search have been discussed above. As the pattern matching engine 322 searches through the string 331, the score computation module 324 may update a set of scores based on patterns found in the string 331. After the pattern matching engine 322 has terminated the search, the scores are output to the classifying engine 326. The classifying engine 326 may further receive a model from the model repository 335. Based on the scores, the classifying module 326 classifies the content of the string 331 into one or more categories. For example, the classifying engine 326 may compare the scores from the pattern matching engine 322 with the model in order to classify the content of the string 331. Details of some embodiments of content classification have been discussed above.

Then the classifying engine 326 sends the classification to the content filter 328, which also receives a copy of the string 331. Based on the classification, the content filter 328 determines whether to allow access to the string 331 by the client machine 330 according to some predetermined policies. For example, the client machine 330 may be a laptop computer used in work place and thus, the client machine 330 is not allowed to access pornographic materials. If the classifying engine 326 classifies the string 331 to be pornographic, then the content filter 328 blocks the string 331 from the client machine 330. In another example, the content may be classified to be messages or postings in an Internet chat room and access to which may be blocked during work hours. If the string is blocked, the content filter 328 may generate an error message to inform the user of the client machine 330 that access to the content represented by the string 331 is denied. In a further example, the content may be classified to be spam, and thus, the content is blocked from the client machine 330. Alternatively, the spam may be forwarded to the client machine 330, but the spam is marked and put into a folder designated for spam. On the other hand, if the classifying engine 326 classifies the string 331 to be within an allowable category (e.g., education content, news, etc.), the content filter 328 may allow the client machine 330 to access the string 331, and thus, the content filter 328 forwards the string 331 to the client machine 330.

In some embodiments, the client machine 330 includes a display device. The network access application being executed on the client machine 330 may render the content via the display device if the string 331 is forwarded from the content filter 328. Otherwise, the network access application may render the error message from the content filter 328 via the display device if access to the string 331 is denied because of the classification of the string 331.

Figure 4:
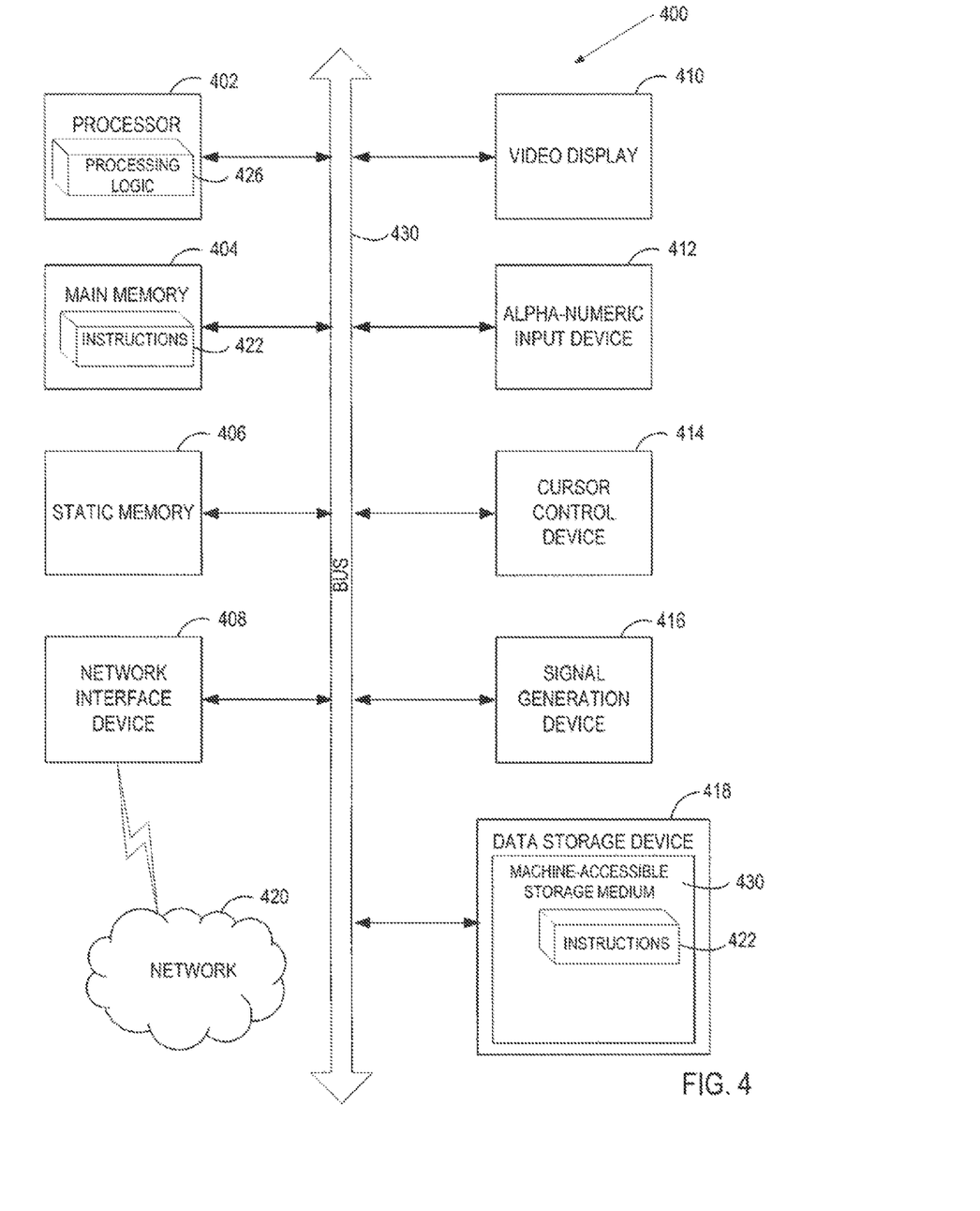
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of on-the-fly pattern recognition with configurable bounds have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for filtering data, the method comprising:
   receiving an incoming dataset at a firewall via a network, the incoming dataset directed to a receiver device;
   executing instructions associated with a pattern matching engine by a processor associated with the firewall, thereby generating a score corresponding to the incoming dataset's association to at least a first category of a plurality of categories, the score generated based on identification of a plurality of features within a string of the incoming dataset;

classifying the incoming dataset into the first category of the plurality of categories based on the generated score and based on the string of the incoming dataset not exceeding a predetermined maximum sample size; and identifying that the incoming dataset should not be transmitted to the receiver device based on the first category.

2. The method of claim 1, wherein the score corresponds to a likelihood that the content of the string corresponds to at least one of the plurality of categories.

3. The method of claim 2, wherein at least a subset of the string was previously categorized through a user interface.

4. The method of claim 1, wherein classifying the incoming dataset includes meeting previously-defined bounds, wherein the previously-defined bounds include at least one of a user-defined bounds, model-based bounds based on one or more models generated from analysis of one or more pre-classified strings, or some combination thereof.

5. The method of claim 4, wherein the previously-defined bounds include a predetermined search time limit.

6. The method of claim 4, wherein the previously-defined bounds include a predetermined threshold value associated with at least one of the plurality of categories, wherein classification of the incoming dataset includes comparing the generated score to the one or more predetermined threshold values.

7. The method of claim 1, wherein the firewall is implemented in one of a personal computer, a tablet computing device, a set-top box, a personal digital assistant, a cellular telephone, a web appliance, a proxy server, a gateway server, a network router, a network switch, or a network bridge.

8. The method of claim 1, further comprising receiving the instructions associated with the pattern matching engine at the firewall from a second device via the network.

9. The method of claim 1, wherein the incoming dataset includes at least part of a web page requested by the receiver device.

10. The method of claim 1, wherein the incoming dataset includes at least part of an e-mail message directed to an e-mail recipient address associated with the receiver device.

11. The method of claim 1, wherein the plurality of categories includes at least one of a spam category, a pornography category, or some combination thereof.

12. A system for filtering data, the system comprising:
a network interface associated with a firewall, wherein the network interface receives an incoming dataset via a network, the incoming dataset directed to a receiver device;
a memory associated with the firewall; and
a processor associated with the firewall and the network interface, the processor coupled to the memory, wherein execution of instructions stored in the memory by the processor:

generates a score corresponding to the incoming dataset's association to at least a first category of a plurality of categories, the score generated based on identification of a plurality of features within a string of the incoming dataset, classifies the incoming dataset into the first category of the plurality of categories based on the generated score and based on the string of the incoming dataset not exceeding a predetermined maximum sample size, and identifies that the incoming dataset should not be transmitted to the receiver device based on the first category.

13. The system of claim 12, and wherein the incoming dataset includes at least part of an e-mail message directed to an e-mail recipient address associated with the receiver device.

14. The system of claim 12, wherein the plurality of categories includes at least one of a spam category, a pornography category, or some combination thereof.

15. The system of claim 12, wherein the incoming dataset includes at least part of a web page requested by the receiver device.

16. The system of claim 12, wherein the receiver device is one of a desktop personal computer, a laptop personal computer, a personal digital assistant, or a mobile telephone.

17. The system of claim 12, wherein classifying the incoming dataset includes meeting previously-defined bounds, wherein the previously-defined bounds are at least one of user-defined bounds, model-based bounds based on one or more models generated from analysis of one or more pre-classified strings, or some combination thereof.

18. The system of claim 17, further comprising a model repository communicatively coupled to the network interface, wherein the model repository includes the one or more models.

19. A non-transitory computer-readable storage medium, having embodied thereon a program executable by a processor to perform a method for filtering data, the method comprising:
receiving an incoming dataset at a firewall via a network, the incoming dataset directed to a receiver device;
executing instructions associated with a pattern matching engine by a processor associated with the firewall, thereby generating a score corresponding to the incoming dataset's association to at least a first category of a plurality of categories, the score generated based on identification of a plurality of features within a string of the incoming dataset;
classifying the incoming dataset into the first category of the plurality of categories based on the generated score and based on the string of the incoming dataset not exceeding a predetermined maximum sample size; and
identifying that the incoming dataset should not be transmitted to the receiver device based on the first category.

* * * * *